United States Patent [19]
Luquet et al.

[11] Patent Number: 5,515,485
[45] Date of Patent: *May 7, 1996

[54] METHOD AND DEVICE FOR MODIFYING A ZONE IN SUCCESSIVE IMAGES

[75] Inventors: André Luquet, Paris; Michel Rebuffet, Rueil Malmaison, both of France

[73] Assignee: Symah Vision, Paris, France

[*] Notice: The term of this patent shall not extend beyond the expiration date of Pat. No. 5,353,392.

[21] Appl. No.: 308,912

[22] Filed: Sep. 20, 1994

Related U.S. Application Data

[63] Continuation of Ser. No. 776,416, filed as PCT/FR91/00296, Apr. 10, 1991, Pat. No. 5,353,392.

[30] Foreign Application Priority Data

Apr. 11, 1990 [FR] France .................. 90 04663

[51] Int. Cl.⁶ .................................................. H04N 5/262
[52] U.S. Cl. ...................... 395/135; 395/127; 395/152; 348/578; 348/580
[58] Field of Search ................... 395/135, 127, 395/138, 139; 348/578, 580

[56] References Cited

U.S. PATENT DOCUMENTS

| | | | |
|---|---|---|---|
| 2,921,124 | 1/1960 | Graham | 178/6 |
| 3,016,518 | 1/1962 | Taylor | 340/149 |
| 3,051,778 | 8/1962 | Graham | 178/6.8 |
| 3,140,710 | 7/1964 | Glassner et al. | 128/2.05 |
| 3,315,222 | 4/1967 | Bogs | 340/15.5 |
| 3,470,468 | 9/1969 | Halpern | 324/77 |
| 3,473,121 | 10/1969 | Hurtig et al. | 324/77 |
| 3,582,957 | 6/1971 | Herleikson | 346/33 |
| 3,715,477 | 2/1973 | Olson et al. | 178/5.4 R |
| 3,731,188 | 5/1973 | Smith | 324/77 |
| 3,737,855 | 6/1973 | Cutaia | 340/146.3 |
| 3,742,201 | 6/1973 | Groginsky | 235/156 |
| 3,887,762 | 6/1975 | Uno et al. | 178/6 |
| 3,973,239 | 8/1976 | Kakumoto et al. | 340/146.3 AG |
| 3,983,328 | 9/1976 | Newell | 178/6.8 |
| 3,996,421 | 12/1976 | Pruznick et al. | 178/7.3 D |
| 4,000,399 | 12/1976 | Kawahara | 235/92 PC |
| 4,010,446 | 3/1977 | Kawa | 340/146.3 H |
| 4,055,756 | 10/1977 | Jolivet et al. | 364/725 |
| 4,057,828 | 11/1977 | Monahan | 358/32 |
| 4,134,134 | 1/1979 | Lux | 358/28 |
| 4,163,258 | 7/1979 | Ebihara et al. | 358/167 |
| 4,205,341 | 5/1980 | Mitsuya et al. | 358/135 |
| 4,222,076 | 9/1980 | Knowlton | 358/263 |
| 4,242,705 | 12/1980 | Ebihara | 358/163 |
| 4,947,342 | 8/1990 | Katsura et al. | 395/136 |
| 5,045,844 | 9/1991 | Takano et la. | 340/724 |
| 5,107,252 | 4/1992 | Traynas et al. | 358/22 |
| 5,353,392 | 10/1994 | Luquet et al. | 395/135 |

OTHER PUBLICATIONS

"Past Algorithms for Estimating Local Image Properties", P. Burt, 1982 IEEE, pp. 669–671.

Primary Examiner—Heather R. Herndon
Assistant Examiner—Paul A. Roberts
Attorney, Agent, or Firm—Larson and Taylor

[57] ABSTRACT

A process modification of the content of a sequence of images which can be represented as a matrix of pixels. For that purpose a non-deformable target zone to be replaced in the scene is identified and is characterized, both in position and in dimensions, by reference to marks located close to each other and connected to the target zone in each image. The position with respect to the marks to be assigned to a model which can be superimposed on the target zone, stored in digital form, is determined. For each particular image, the geometrical transformation to be carried out on the model so that it corresponds to variations in the appearance of the target zone in all the successive images in the same shot is determined automatically using a correlation calculation based on the marks. Data suitable for enabling replacement of each current representation of the target are derived from the transformation and output. Apparatus for carrying out the method is also described.

4 Claims, 8 Drawing Sheets

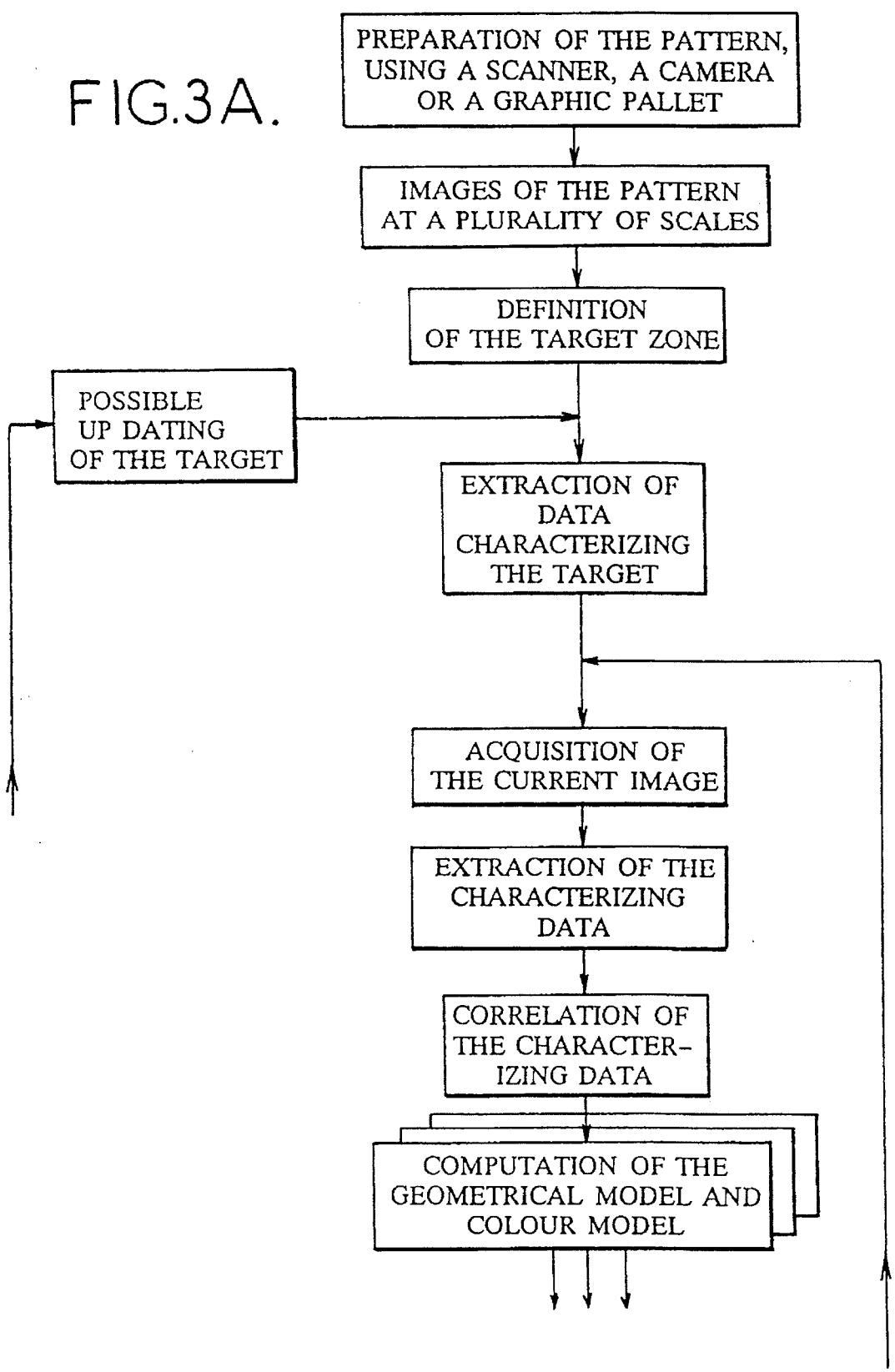

To Fig. 4B

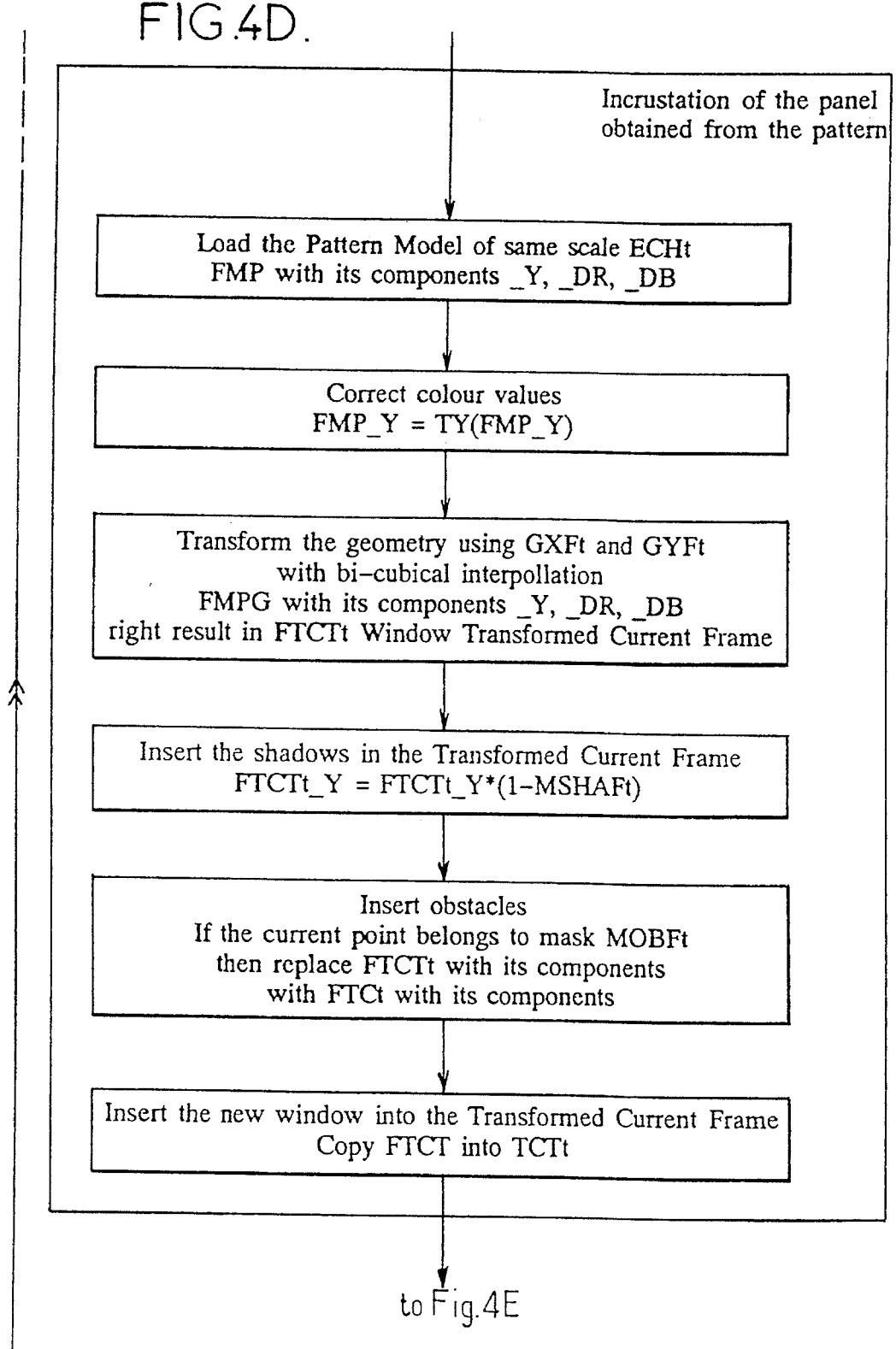

METHOD AND DEVICE FOR MODIFYING A ZONE IN SUCCESSIVE IMAGES

CROSS-REFERENCE TO RELATED APPLICATIONS

This application is a continuation of application Ser. No. 07/776,416, filed as PCT/FR91/00296, Apr. 10, 1991, now Pat. No. 5,353,392.

BACKGROUND OF THE INVENTION

The invention relates to a method and device for modifying a zone in successive images forming a sequence, representing an evolutionary scene, delivered by at least one camera.

The term "image sequence" must be interpreted in a wide sense as designating not only the image signal (analog or digital) produced in real time by a camera or a video controller but also a sequence recorded on an inscribable filing medium (digital or analogue), on a photographic, magnetic or optical medium, in a form allowing subsequent display, delivery or broadcasting at a rate equivalent to the real time rate.

More precisely, the invention relates to a method and device for replacing an image fraction corresponding to a precise region or to an object of the scene which will be named hereafter "target area", with a representation of another precise region, or another object, which is real or not, which will be named hereafter "pattern".

The fields of application of the invention are extremely various. The following may be mentioned, non limitatively advertising, the method making it possible to add or replace advertising panels during transmissions or retransmissions of sporting events or others;

production of audio-visual works, particularly fictional works, the method then making it possible to replace the scenery during shooting of production with another scenery;

simulation, in which the method makes it possible to insert the representation of a real object in an environment formed by a synthetic image.

Numerous methods are already known which can be used for modifying a target area in an image. The target area may for example be identified by a particular colour, which is preferably unused in the rest of the image to avoid any imbiguity. But this method does not take into account the image acquisition conditions, for example camera movements. The pattern cannot consequently follow the evolution of the scene satisfactorily.

In image synthesis a pattern may also be generated which is inlaid in a target area, but on condition, that position, focal distance and focussing do not change.

These methods, as well as the use of superimposed shots for producing motion pictures associating real scenes and animated cartoon characters, have limitations which exclude use thereof or reveal the special effects whenever the image acquisition conditions vary significantly in time.

Last, there is known (EP-A-0 360 576) a method enabling to generate a composite sequence from two sequences of video pictures. An operator manually indicates at least all reference points which represent the corners of a polygon and a transformation circuit modifies the addresses of the pixels in the polygon for enabling combination.

That method requires a manual operation for each picture.

SUMMARY OF THE INVENTION

An object of the invention is to provide a method for modifying a same zone in successive images in a same sequence fulfilling the requirements of the technique better than those known heretofore, which can be used even when the acquisition conditions change, particularly centring, focal distance and focussing, by automatically taking this evolution into account.

For that purpose, inlaying of the image the image of the pattern is preceded by a phase of adaptation of that image so as to cause it to exactly correspond to the representation of the target area in the image.

For that purpose the invention provides a method for modifying the content of a sequence of images representing an evolutionary scene and having a high degree of correlation between successive images of the same shot, the images being adapted representation as a matricial arrangement of pixels, characterized by: identifying a non-deformable target area to be replaced in the scene is identified and it is characterizing its position and dimensions by reference to reference marks related to and close to the target area in each image; determining the position, with respect to said reference marks, to give to a pattern superimposable on the target area, stored in digital form; for each particular image, automatically computing the geometrical transformation to be undergone by the pattern to make it correspond to the variations of appearance of the target area, but a correlation calculation based on the reference marks, in all successive images of the same shots; and substituting the pixels representative of the pattern in the image for the pixels representative of the target area.

The term "shot" designates an image sequence representing the same scene acquired by the same camera without sudden time or space disruption.

When the invention is carried out in delayed time, the marks may be manually indicated on the first image of each shot for easier computation. The operation may be carried out by pointing a light pen or on a table. In real time, the search may be carried in the whole image or, more frequently, only in a predetermined portion.

After the first image, the search by image processing is rendered easier since the movements of the target zone and the variations in size from one image to the next are limited by the characteristics of the camera. It is implemented by searching "characterizing points" (typically angles of contrast lines) which are distributed and whose representation is stored within the target zone. If for instance the target is an advertisement bill-board carrying alpha-numerical characters, the "characterizing points" can be graphemes which are particularly significant, such as junctions between vertical portions and transversal bars in certain letters. Recognition is then carried out on neighbourhoods whose size is for instance 6×8 pixels, using pattern recognition processes which are well known and which are sufficient whatever the scale of the image. When the image is affected with noise, it is preferable to search for 10 to 20 characterizing points for having a sufficient number of recognitions. Then, from the position of the characterizing points, at least four marks are derived which have a characterizing geometrical distribution, for instance the four edges of an advertising billboard.

The invention can be applied even when the scene comprises fixed or mobile obstacles placed between the camera and the target area and which may be interposed between them; in this case, the parts of the image corresponding to the obstacles will be identified through their lack of correlation with the surroundings, on condition that the luminance and/or colour of the obstacle differs from that of the background; only that part of the target area which is not masked by the obstacle will be replaced.

In all cases, the method according to the invention uses space and time continuity of the scene during a same shot.

The invention also provides a device for implementing the above-defined method, comprising picture forming means delivering each image as of a matrix of pixels, the radiometric values (luminance and possibly chrominance) of each pixel being in digital form, characterized in that it further comprises:

means for storing reference marks for locating a target area in the image and representations of the target area on with a plurality of scales and for storing representations on the same scales, of a pattern which can be superimposed on the target area, means for recognizing the reference marks in the current image and deriving therefrom the position and dimensions of the target area, and means for automatically determining for each image, by spatial correlation calculation based on the reference marks, the geometrical transformation to which the pattern should be subjected to correspond to the variations of appearance of the target area, in all successive images of the same shot and for substituting, in the image, the pixels representive of the pattern for the pixels representative of the target area.

The invention will be better understood from the following description of a particular embodiment given by way of example. The description refers to the accompanying drawings in which:

BRIEF DESCRIPTION OF THE DRAWINGS

FIGS. 4A–4E constitute a flow sheet for implementing the method in particular conditions (images shot by a TV camera which may only rotate).

DETAILED DESCRIPTION OF PREFERRED EMBODIMENTS

The method of the invention will be described in its application to the substitution of a pattern, formed by an advertising panel of fixed dimensions and location, for a target formed by another advertising panel. The two billboards or panels are rectangular and can be identified by the edges of each panel. "Characterizing points", typically 10 to 20 in number, are defined in the target and consist of graphemes which may easily be identified. If the target contains alpha-numeric characters, the Graphemes are for instance crossings between bars, defined in a neighbourhood which is for instance of 6×8 pixels.

This application may be used in particular in the case of a sporting event broadcast in several countries with different advertising billboards.

PRELIMINARY STEPS

A preliminary step consists in selecting and storing the target, or the image area which contains it, in the form of a plurality of representations:

at different scales, throughout the whole variation range which may be covered by varying the focal distance of the camera, for example, at successive scales derived one from the other by multiplying by a root of two; for rendering correlation easier;

possibly, with different perspective angles in the case of a target whose angular positions with respect to the camera may vary.

Then, with a computer, characterizing data bound to the target are extracted, for the different predetermined scales. The characterizing data can be angle points of the contrast line. They could be:

elements of the target itself, such as graphemes having a non-variable relative arrangement, angular points of the periphery, a distribution of colours, and/or elements which have a non-variable position in the scene with respect to the target, surrounding the target and easily identifiable with the above-defined criteria.

An additional preliminary step consists either to select the "pattern" in a library of digital images or, if the pattern does not yet exist, to have it created by a designer, which may use a hardware-software device of the graphic pallet type (Hariette of Quantel —1990—, or TIPS on ATT Vista board —1988—) or still to generate it by digitizing a picture acquired with a TV camera or a scanner. Such a generation operation is conventional and out of the field of the invention.

From this image, several secondary images are generated which correspond to the same scales as those of the target.

ACQUISITION

For easing the requirements regarding computation speed, the device for implementing the invention typically will operate in delayed time, from stored images. For simpler illustration, FIG. 1 however shows the means for seizing the images and the modification device itself.

Figure 1B:
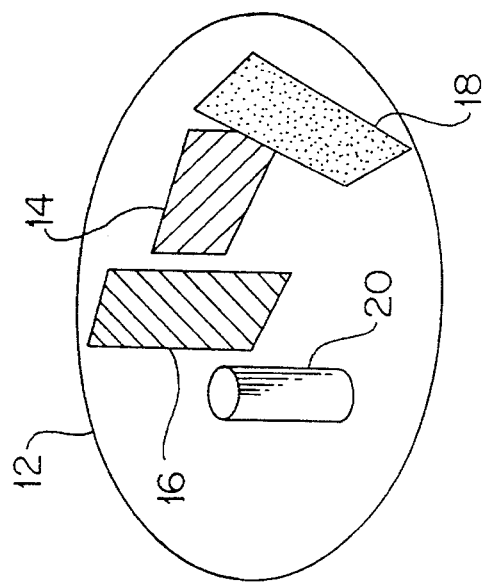
FIG. 1 is a general diagram showing an observed scene, a target object, an obstacle and a shot-taking camera.
Figure 1A:
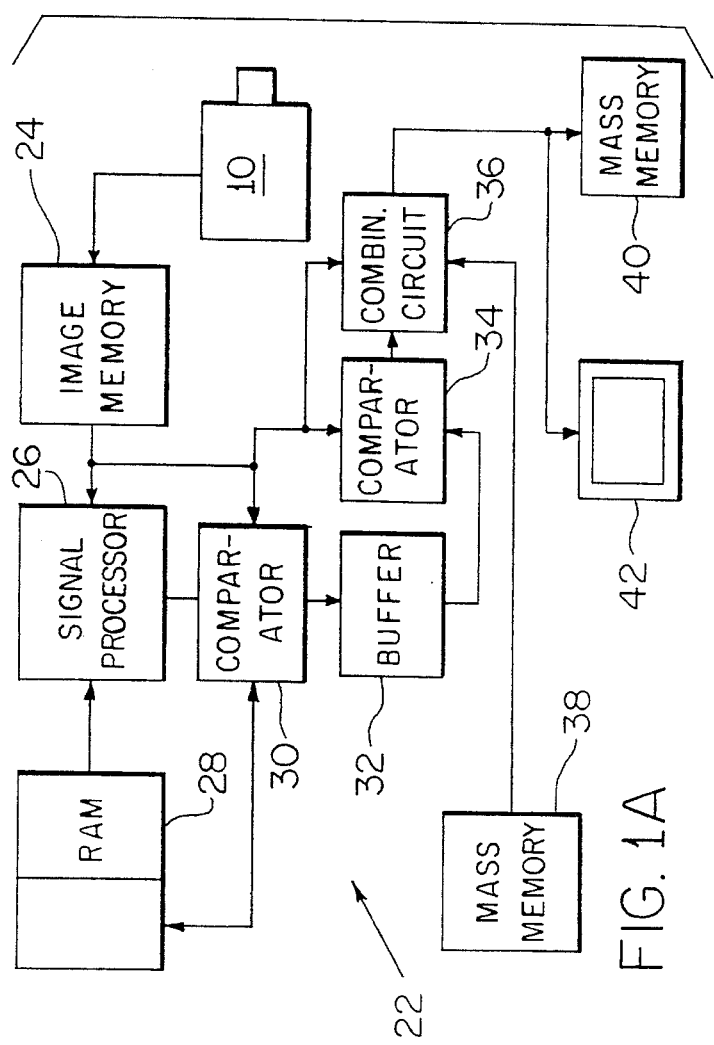

FIG. 1 shows by way of example a TV camera 10, which will be assumed to have a variable focal distance, directed towards a scene 12 containing a target 14 to be replaced, the target being in an invariable position with respect to two objects 16 and 18 and possibly being partially or wholly masked by an obstacle 20. Camera 10 is connected to a recorder, such as a magnetoscope, when transformation is carried in delayed time. When operating in real time, the camera directly feeds a computer 22 via an analogue-digital converter if it does not deliver the image in the form of a matrix of pixels each identified by a multi-bit word representing luminance and possibly chrominance values.

Figure 2:
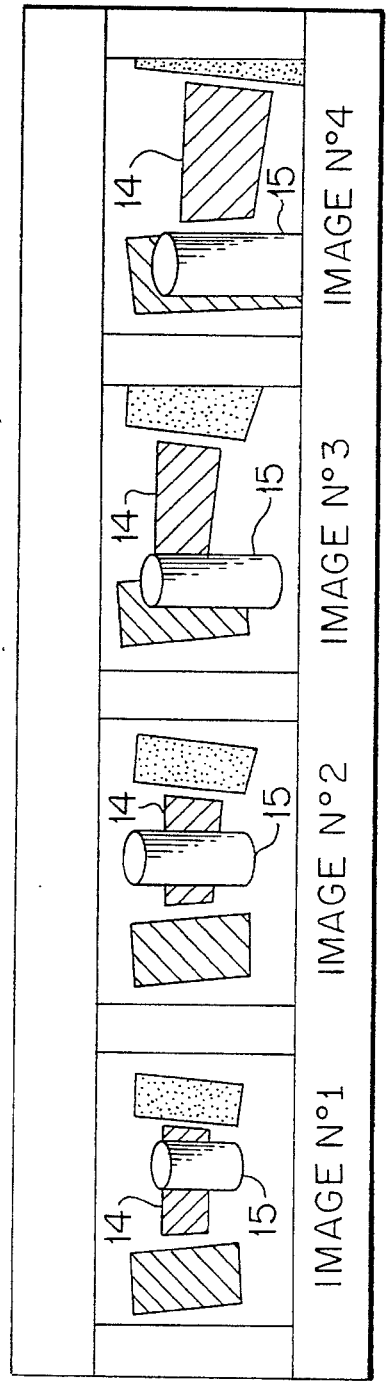
FIG. 2 is a representation of the image of the scene at successive moments, FIG. 3A and 3B form a flow chart of the method.

The method of the invention processes each shot independently of the others: for each shot, the successive images are acquired by the same camera 10 and have a high degree of space and time correlation, the evolution of the image being progressive. As shown in FIG. 2, the target area 14 may vary in dimensions and, in some images, may be masked by an obstacle 15 (images numbered 1, 2 and 3 in FIG. 2).

Then, the computer extracts data which characterize the target panel on the one hand, the pattern panel on the other hand, for the same scale. The data may be:

The camera 10 may have means indicating, to computer 22, the variations of parameters related to the camera, such as the focal distance, for more readily matching characteristic elements of the target panel with corresponding elements found in the different representations of the moving element, stored or obtained by interpolation; full tracking of the target by that approach is however not satisfactory, due to unavoidable vibrations, error accumulation and need of a non standard video device. It is preferable to estimate the modification in the focal length of the camera and the elevation and bearing angles (consequently the angle under which the camera seizes the target panel) with a mathematical model.

The model may be set by using the x and y coordinates of the corners of the panel. It is particularly known that the variations of the focal length result in a variation along direction x of the type:

$$X=ax+b \quad (1)$$

and the angular variations (conical perspective) in:

$$X=(cs+d)/(ex+f) \quad (2)$$

where a, . . . , f are constant values. Frequently model (2) may be modified as a second degree polynome.

The first operation carried out on the current image by computer 22 is the search for the target panel 14, by searching for the best possible match with the characterizing data stored. This search takes place by conventional methods of digital correlation, between characterizing points of the pattern, at the different scales, and the characterizing points extracted from each image. It takes into account that obstacles can mask some of the characterizing points.

The search may be simplified if it takes into account constraints:

of geometrical evolution, due to the device (since there are limitations to the speed of variation of the focal length and to the rotational speed);

of evolution of shapes imposed by the device or the scene.

When only transformations of the "geometrical similitude" type, caused by focal length variations with slight rotations, are to be taken into account, a geometrical deformation mathematical model is sufficient, of the type used for image-to-image diachronic remote detection (for instance implemented in the ATG System—Atelier de Traitement Géométrique du CNES —1986— available from Société Européenne de Propulsion). It is obtained by minimizing the rests as a polynomial function of degree one or two, as long as the lens of the camera do not introduce significant distortions, i.e. aberrations due to a target which is too close.

On the other hand, when large modifications of angular position occur, the geometrical deformation mathematical model introduces modifications in the shape of the target panel on the current image; then modelisation as a ratio of two polynomes, as indicated hereinabove, is used.

By low-pass time filtering on geometrical models resulting from several successive images (for instance arithmetic average on two to four images) of a same shot, the stability in time of the mathematical models, so their quality, may be estimated. It is then possible to select, among several models, the model which best represents the geometrical transformation. By using characterizing points which are in large number and distributed within the whole of a target, it is possible to identify the target even when points are behind an obstacle.

If the focal distance and orientation information are not supplied by sensors carried by the camera while the size of the target is known, the geometric transformation mathematical model also allows the focal distance and the elevation and bearing angles to be estimated.

By way of example, the characterizing data used for estimation of the focal length and angles may, in the case of a target formed by a horizontal rectangular advertising panel with a white background and a camera only having elevational and lateral deflection movements, be the four graphemes formed by the four corners of the panel. They may be marks of a particular form (such as dots, crossed lines) on a uniform background, (wall, cloth, . . . . ) if the pattern is to be inlaid on such a background upon display: the distribution of the marks will then be homothetic of that of particular graphemes in the pattern.

COLORIMETRY

Once the geometric transformation mathematical pattern has thus been determined, it is generally necessary to estimate the colour transformation between the typical target panel (main image and representations) and the zone which corresponds thereto in the current image, i.e. to calculate a mathematical colorimetric transformation pattern. Such transformation is in most cases advisable, due to variations of lighting and in the response of the camera. The mathematical model is a linear transformation based on a comparison between only the neighbourhoods and points of the target panel serving for effective search for matching. The model may be elaborated by linear regression on the intensity and on the colour components R, G, B. It is in fact necessary to exclude the points which might belong to an interposed obstacle (images numbered 1, 2 and 3 in FIG. 2).

In this case again, a stability estimation time filtering is carried out for moving the influence of noise inherent in the quantification of the colours.

Figure 3B:
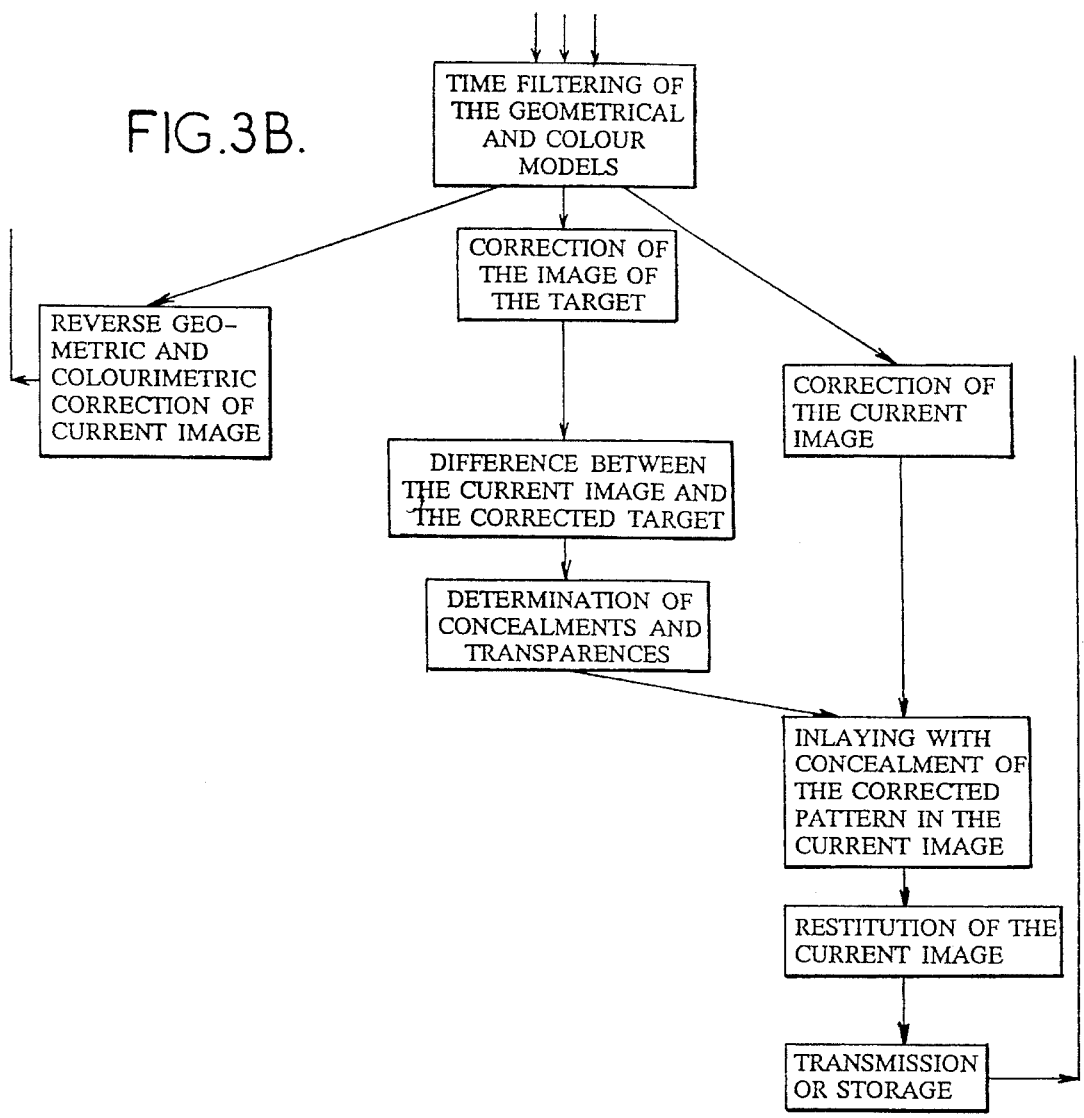

All these operations appear in the main path of the schematic flow sheet of FIG. 3A and, for each image, lead to generation of two geometrical transformations for passing from a stored representation of the target to the true image of the target area.

POSSIBLE EVALUATION OF THE MTF

At this stage, it is useful to estimate the modulation transfer function, i.e. the difference of sharpness between the target panel in the current image and its stored representation. For that, the frequency spectra of the neighbourhoods of the mutually corresponding points are compared. This analysis globalizes the image motion, i.e. the effect of movement, and the focussing defects.

TRANSFORMS

Then, the stored representation of the target panel is subjected to (1) the geometric transformation model, then (2) the shade transformation model and finally—under certain circumstances—(3) the modulation transfer function.

Each of these transformations is a linear transformation. So their applications may be combined.

At this step, a transformed current image of the sequence is available in which the target panel has been replaced with the representation of the target panel (previously generated image of the target model).

The pixels of the transformed current image which differ from the initial current image correspond to those points of the initial current image which represent something other than the target panel, thus to an obstacle interposed between the camera and the panel.

That set of points constitutes a mask associated with the obstacles. It will be possible to only inlay the portion of the pattern corresponding to the non-masked zone (opaque obstacle) or to locally modify the pattern before inlaying (semi-transparent obstacle). Substitution of the pattern is pixel per pixel.

In particular, a moving obstacle may create an effect of semi-transparency: an apertured obstacle (tennis net) or of small size (ball) may have the same effect.

To deal with such a case, the method of the invention uses, in a particular embodiment, a transparency map based on an a-priori evaluation or adjusted as a function of the real scene. For example, a degree of transparency equal to 1 is assigned to the non-masked points of the panel and a transparency equal to 0 (zero) is assigned to the points corresponding to the obstacles. For semi-transparent obstacles, or for rapidly moving objects, an intermediate value is assigned to the corresponding points. It is assumed that, on the scale at which the scene is observed, the non-transparent obstacles are compact, which makes it possible to spatially filter the transparency map by a conventional "closing" method of mathematical morphology.

The transparency map may be time filtered for fixed obstacles; it is also possible to time filter the rapidly moving obstacle, by assuming that their size varies slowly. Then conventional closing and opening operations of mathematical morphology may be used. A description may be found in the book by J. SERRA "image analysis and mathematical morphology" 1982, Academic Press, London.

If a confusion between colours is possible between an obstacle and points of the target panel which is masked by the obstacle, discrimination of the obstacle may be significantly improved by using a camera which operates in at least four spectral bands, rather than three spectral bands, thereby extending the capability of measuring the radiometric values of the points of the observed scene beyond the eye-visible spectrum. The method is already used for analysing plant cover on views taken from satallites: the fourth band is often in the near infra-red.

REPLACEMENT

Once these operations have been carried out, all data necessary for replacing the target panel by the pattern panel are available.

Replacement requires successively (a) the processing of the stored pattern panel, then (b) substitution of the pixels obtained for those of the image delivered by the camera and possibly stored.

(a) Processing implies carrying out on the image of the pattern panel, at a scale corresponding to that used for identifying the target panel, the same geometric, colorimetric and possibly image motion transformations; then the transparency function is applied (identity in the case of transparency equal to 1, suppression in the case of zero value, attenuation in the case of semi-transparency). The result obtained is inlaid in the current image before storage or broadcasting.

Time filtering may be purely predictive and only take past images into account. It may use partially or totally a-posteriori or recursive filtering, provided that a "rotating" memory forming a delay line is used, whose capacity is a few images.

Time filtering, if used, requires detecting each change of shot which results in a discontinuity of the transformation, which is steady and continuous in the same shot.

The shot changes may be indicated by a sensor equipping the central control. It is also possible—and this is the solution which will generally be adopted—to automatically detect each change of shot by the discontinuity which it introduces into the contents of the image of the observed scene.

For example, in the case of zooming, there will be a re-estimation by searching the representation scale of the target panel, which causes the representation to match best with the target panel in the current scene. This operation may be carried out by a correlation method applied to lists of characteristic points of the type called "branch and bound". Then the above-described procedure is resumed. The estimations of the shooting elevation and lateral deflection angles are also compared, which allows to determine which camera takes the new shot, provided that it has not moved since the preceding shot which it acquired. The operations to be carried out are illustrated on FIGS. 3A and 3B.

The particular embodiment which has just been described is well-adapted to the case of a target formed by a flat surface. The invention can also be used without significant modification in the case of a target whose surface may be broken up into facettes which may be considered as flat portions, as is currently done in image synthesis.

Break down of the target, on the one hand, and of the pattern, on the other hand, into several facettes may be carried out separately and without any mutual relation.

Computer 22 may have the schematic construction illustrated in FIG. 1, some of the components possibly having the same nature as those described in document EP-A-0 360 576 already mentioned. It comprises a large capacity image memory 24 (hard disk for instance) delivering each image in turn to a signal processor 26. The processor is programmed for identifying and locating the characterizing points of the target, stored as neighbourhoods in a memory 28. The processor delivers, to a comparator 30, the elements which are necessary for selecting the appropriate representation of the target zone in a memory 28 and transfer the representation into a buffer memory 32. A pixel per pixel comparator 34 makes it possible to identify the parts of the target which are masked by an obstacle and to deliver, to a combination circuit 36, the pixels which are necessary for replacing the pixels which are not masked with respective pixels of the appropriate representation of the pattern, read from a memory 38. The resulting image may be stored in a mass memory 40 and displayed on a monitor 42.

FIGS. 4A to 4E illustrate, in detail, the steps of a process in the particular case of a scene which is observed by a single camera having a variable focal length and apt to rotate.

Figure 4A:
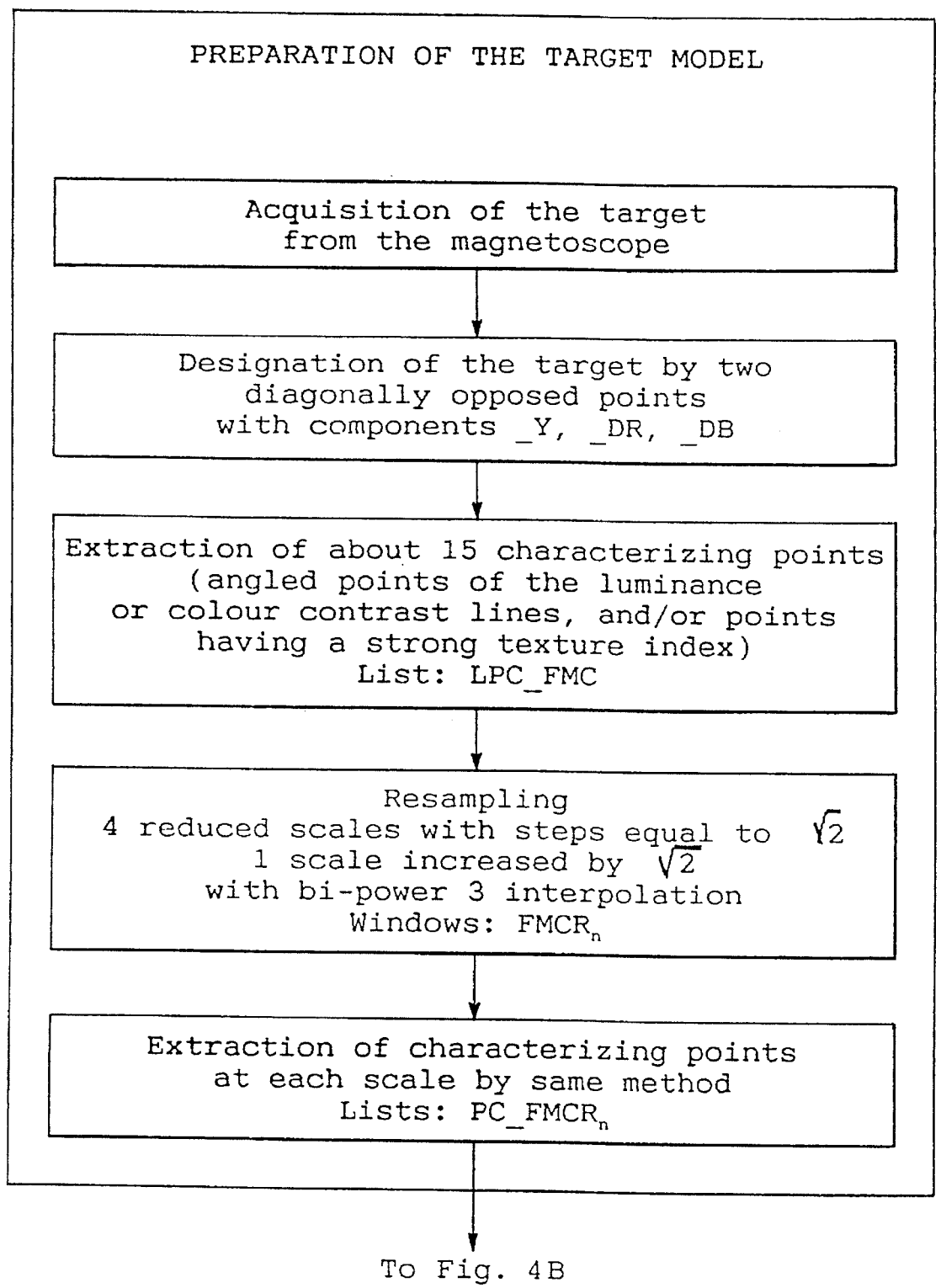

FIG. 4A illustrates preparation of the target model from a magnetoscope, with initialization, for each shot, by designation (for instance with a graphic tablet and a stylus) two diagonally opposite points of the target.

Figure 4B:
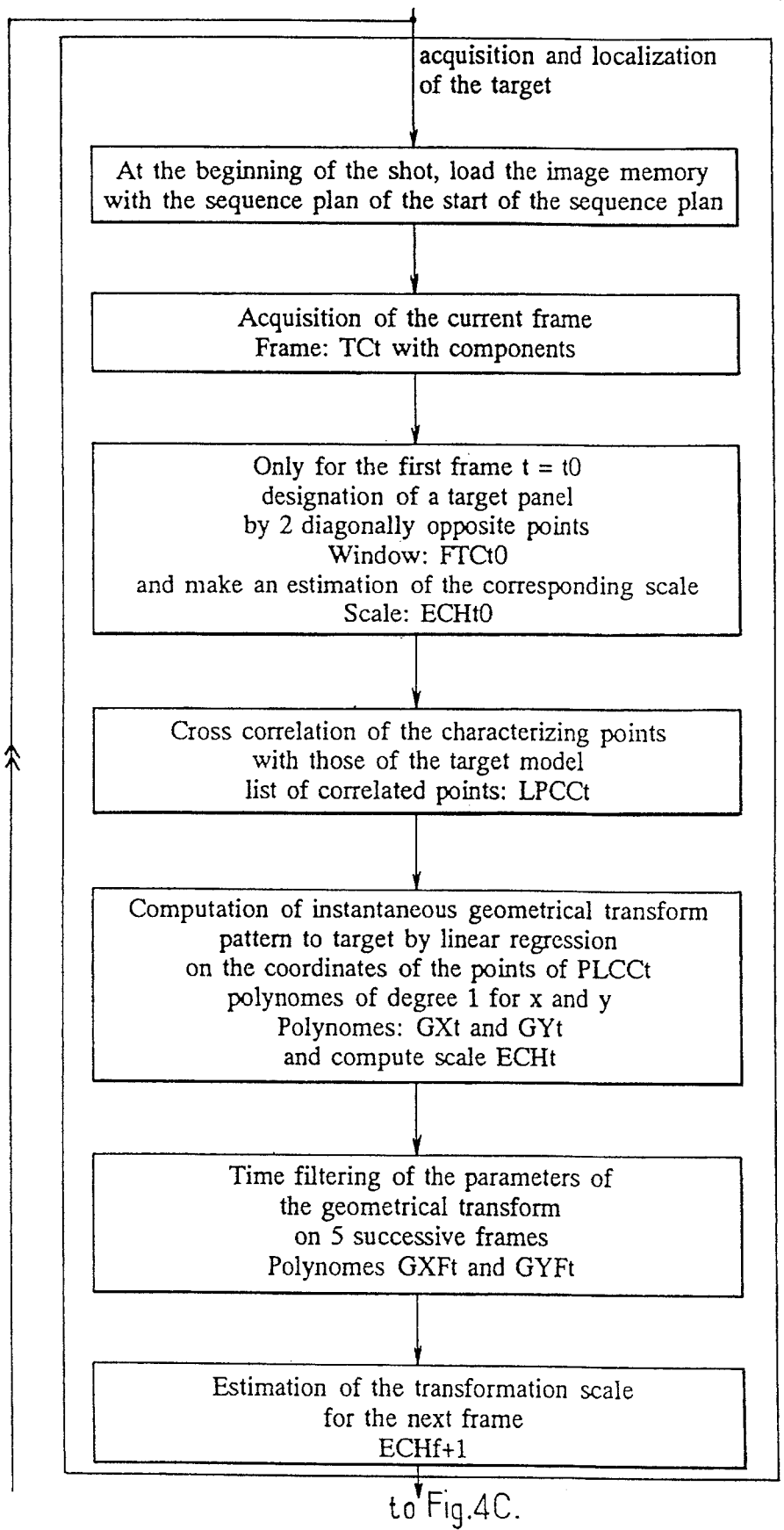

FIG. 4B indicates acquisition and localization of a target panel.

Figure 4C:
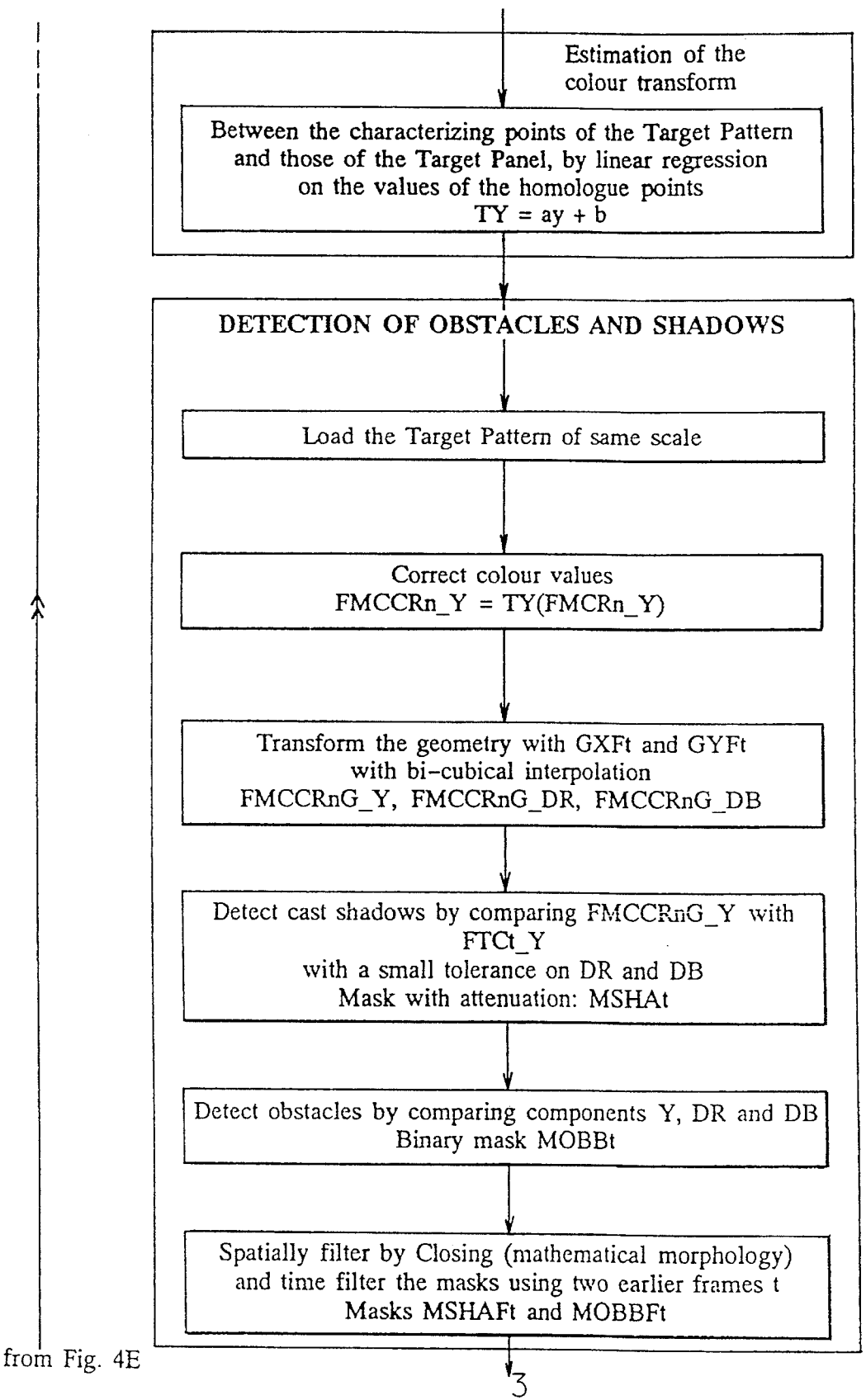

FIG. 4C illustrates steps which are only necessary when the colour transformation should be estimated and when obstacles or shadows should be detected.

FIG. 4D indicates the steps of laying-in the pattern model at the appropriate scale into the image.

Figure 4E:
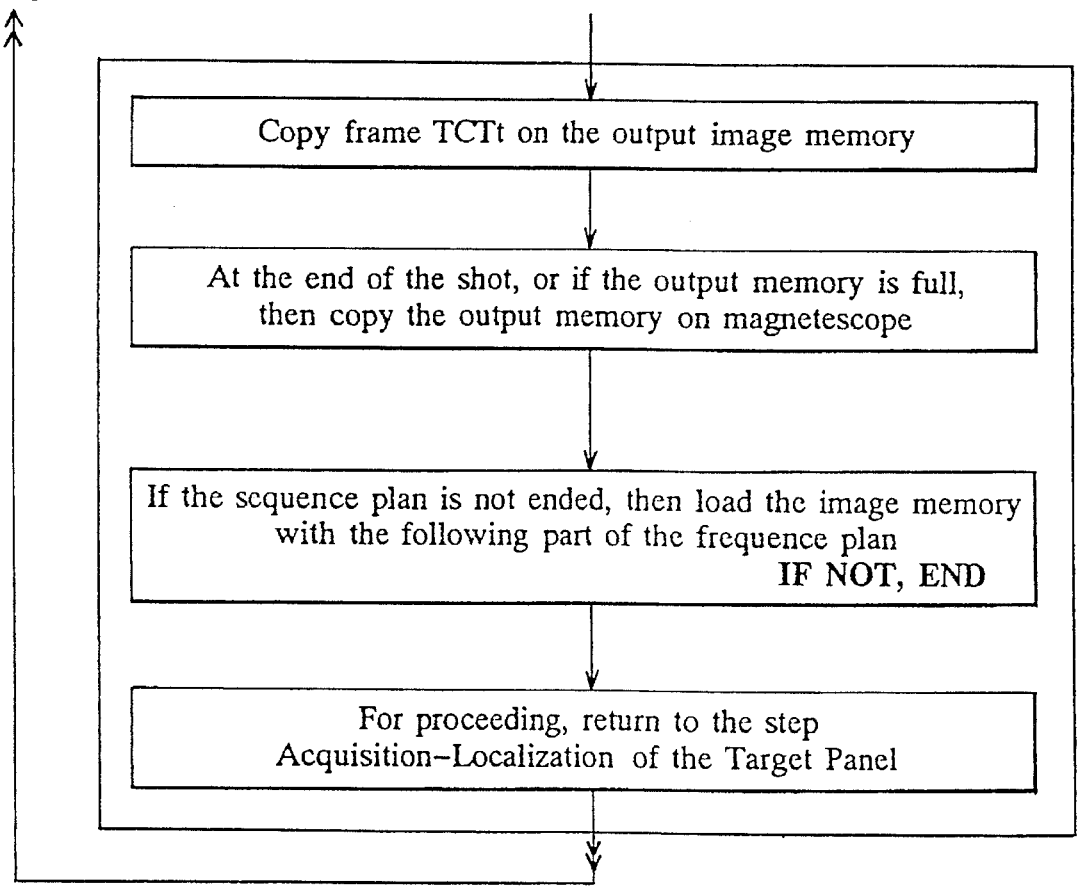

Last, FIG. 4E indicates the steps for storing on a magnetoscope.

We claim:

1. Method for enabling replacement of a current representation of a target in each image of a sequence of successive video images of a scene delivered by a video camera, with a stored pattern, independent of the size of the target representation, said method comprising the steps of:

(a) storing data identifying said target as set of a plurality of distributed characterizing points and a full representation of said target;

(b) automatically recognizing at least a subset of said set of characterizing points in each current image in turn in the sequence and deriving an estimated location, size and perspective of the current representation of said target in said current image from the relative locations of the characterizing points in said current image;

(c) geometrically transforming said full representation of said target responsive to said estimated size and perspective;

(d) determining, by pixel-by-pixel comparison, which part of the geometrically transformed representation of the target is identical to a part of the current representation of said target as it appears in said current image; and (e) generating data necessary for enabling replacement of each said current representation of the target by a matching representation of said stored pattern as a result of the transformation and comparison.

2. Method according to claim 1, wherein step (a) comprises storing characterizing points distributed out of said target and within said target.

3. Method according to claim 1, wherein said characterizing points are stored as neighborhoods of pixels.

4. Method for modifying the content of a sequence of images of a same shot, representing an evolutionary scene and having a high degree of correlation between successive images of said same shot, the images being represented as a matrix arrangement of pixels, said method comprising the steps of:

(a) identifying a non-deformable target zone to be replaced in the scene by a set of reference marks distributed within said target zone;

(b) in each current one of said images, searching for said current image and recognizing said set of reference marks in said current image by a pattern recognition process;

(c) identifying the position and dimensions of said target zone in said current image by referring to said reference marks;

(d) determining a position, with respect to said reference marks, to give to a pattern superimposable on the target zone, stored in digital form as pixels;

(e) for each said current image of said sequence, automatically computing a geometrical transformation to be undergone by the pattern to make it match the variable appearance of the target zone by a correlation based on the reference marks, in all successive images of the same shot; and (f) generating results of steps (d) and (e) as data enabling the substitution of the pixels representative of the pattern in the image for the pixels representative of the target zone.

* * * * *